United States Patent [19]

Bell

[11] Patent Number: 4,684,174
[45] Date of Patent: Aug. 4, 1987

[54] QUICK RELEASE MECHANISM FOR GEAR OPERATED SEAT RECLINER

[75] Inventor: Robert L. Bell, Oxford, Mich.

[73] Assignee: Fisher Dynamics Corporation, St. Clair Shores, Mich.

[21] Appl. No.: 632,597

[22] Filed: Jul. 19, 1984

Related U.S. Application Data

[63] Continuation-in-part of Ser. No. 602,370, Apr. 20, 1984.

[51] Int. Cl.⁴ .............................................. B60N 1/02
[52] U.S. Cl. ..................................... 297/367; 297/366
[58] Field of Search .............. 297/361, 362, 366, 367, 297/368, 369, 370, 371, 378, 379

[56] References Cited

U.S. PATENT DOCUMENTS

| | | |
|---|---|---|
| 2,311,105 | 2/1943 | Will .................................... 297/367 |
| 3,051,526 | 8/1962 | Werner et al. . |
| 3,099,485 | 7/1963 | Beierbach et al. . |
| 3,156,004 | 11/1964 | Strien et al. . |
| 3,259,433 | 7/1966 | Werner . |
| 3,299,466 | 1/1967 | Werner . |
| 3,471,892 | 10/1969 | Resag et al. . |
| 3,848,923 | 11/1974 | Dehler . |
| 3,887,232 | 6/1975 | Dinkel . |
| 3,900,225 | 8/1975 | Wirtz et al. . |
| 3,901,100 | 8/1975 | Lida et al. .......................... 297/367 |
| 4,159,815 | 7/1979 | Strowik et al. . |
| 4,294,488 | 10/1981 | Pickles . |
| 4,295,682 | 10/1981 | Kluting et al. ...................... 297/366 |
| 4,357,050 | 11/1982 | Fisher, III . |
| 4,372,610 | 2/1983 | Fisher, III et al. . |
| 4,457,557 | 7/1984 | Une .................................... 297/367 |
| 4,484,779 | 11/1984 | Suzuki ................................ 297/379 |

FOREIGN PATENT DOCUMENTS

| | | | |
|---|---|---|---|
| 2845281 | 4/1980 | Fed. Rep. of Germany ...... 297/366 |
| 747800 | 4/1956 | United Kingdom ............... 297/367 |

Primary Examiner—Peter A. Aschenbrenner
Assistant Examiner—Mark W. Binder
Attorney, Agent, or Firm—Harness, Dickey & Pierce

[57] ABSTRACT

A gear operated seat recliner mechanism is described which is particularly useful in connection with motor vehicle occupant seats. The recliner permits the angle between the seat back and seat bottom to be varied as desired by the seat occupant. In accordance with this invention, the upper recliner structure pivots about the lower recliner structure and a quadrant component, which pivots with the upper recliner structure, includes a curved toothed rack. The rack meshes with a gear mounted to the lower recliner structure. A pawl is adjustable between an engaged position which fixes the seat back angle to a disengaged postion permitting the seat back angle to be changed relative to the seat bottom. This design improves over prior art designs in that it employs fewer parts, is less costly to produce, and further, permits very fine adjustments in the seat back angle.

25 Claims, 5 Drawing Figures

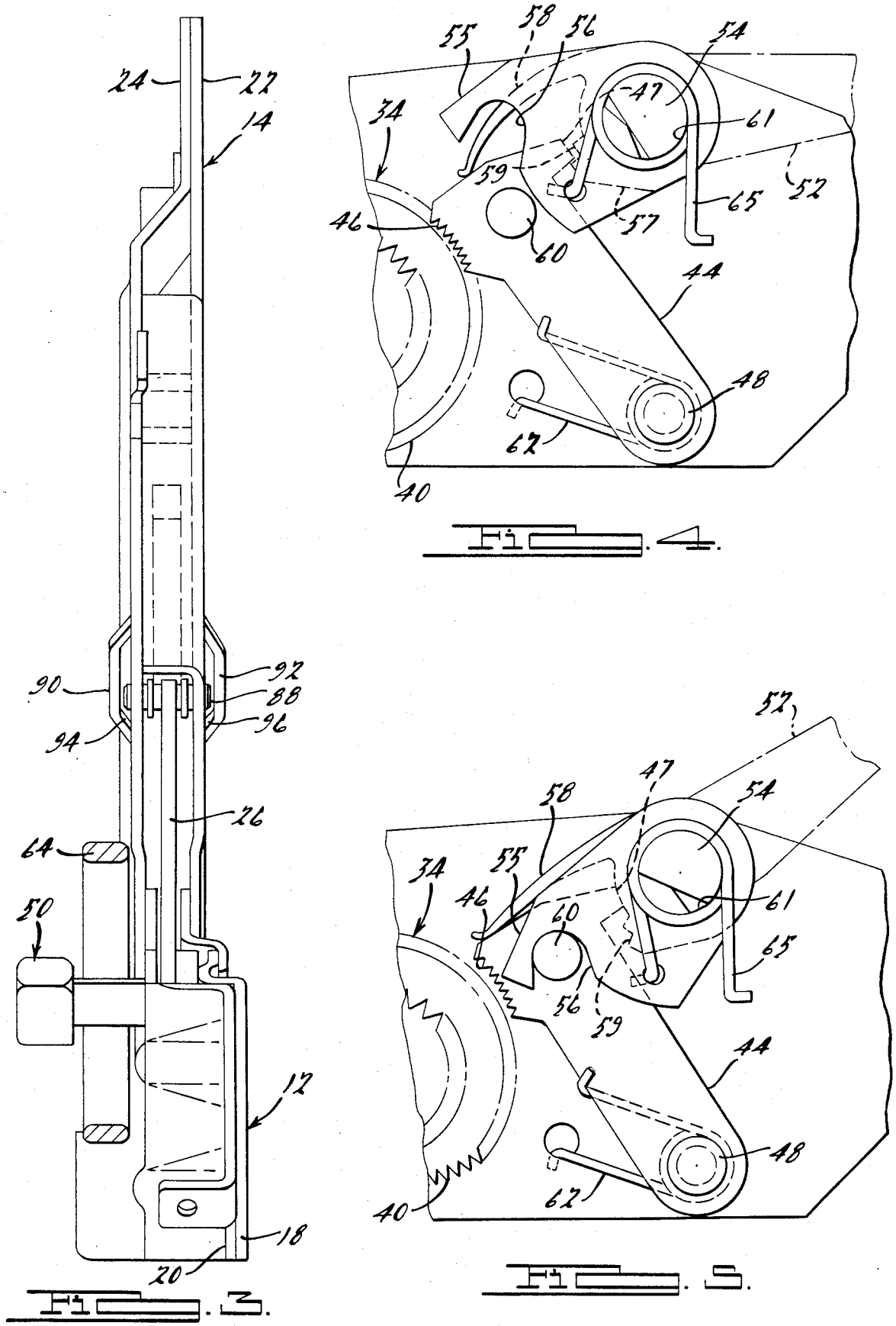

QUICK RELEASE MECHANISM FOR GEAR OPERATED SEAT RECLINER

CROSS REFERENCE TO RELATED APPLICATIONS

This application is a continuation-in-part of copending application Ser. No. 602,370, filed Apr. 20, 1984.

BACKGROUND AND SUMMARY OF THE INVENTION

This invention relates to a seat recliner mechanism and, more particularly, to a motor vehicle seat recliner mechanism which permits the seat back angle relative to the seat bottom to be varied in accordance with the desires of the motor vehicle occupant.

Many motor vehicles are now being provided, as standard or optional equipment, with seat recliner mechanisms which provide added comfort and convenience for the vehicle occupants. Numerous types of seat recliner mechanisms are known to the prior art. For example, U.S. Pat. No. 4,372,610, issued to A. J. Fisher, III et al on Feb. 8, 1983, describes a recliner employing a pair of meshing straight toothed racks. One of the racks is connected to the seat upper recliner structure through a quadrant component. Adjustment of the seat reclined angle is accomplished by changing the meshed position of one rack with respect to the other which is accomplished by operating an actuator. Although such devices perform satisfactorily, it is desirable to provide a seat recliner mechanism which is lighter in weight, less costly, and which provide smaller graduations between adjusted positions of seat back angle. It is further desirable to provide a seat recliner mechanism which provides a positive change in operating mode between engaged and disengagement thereby avoiding objectionable ratcheting as the recliner actuator is moved between positions. Additionally, it is necessary to securely fix the seat back position to prevent inadvertent changes in seat back position.

A seat recliner mechanism in accordance with this invention employs a curved toothed rack on a component which rotates with the upper recliner mechanism and which meshes with a gear that is rotatable within the lower recliner mechanism. Locking of the seat back is achieved by causing teeth of a pawl to engage the gear. Adjustments of seat back angle are provided when the toothed pawl is withdrawn from engagement with the gear, thereby permitting gear rotation as the upper recliner mechanism and the seat back rotate about their pivot point. The above design features are provided in accordance with the invention described by copending U.S. patent application Ser. No. 602,370, filed Apr. 20, 1984, which is assigned to the assignee of this invention and which is hereby incorporated by reference. This invention further discloses the addition of components which provides a quick release feature enabling the recliner locking mechanism to rapidly change from an engaged to a disengaged position.

The recliner mechanism according to this invention is usable for motor vehicle seats which are installed in two or four door type cars. In four door models, the front seat back does not need to be folded forward to permit access to the rear seat occupant area. However, in two door designs having a rear seat occupant area, such provisions are necessary. Therefore, this invention is described in conjunction with an inertia sensitive seat back locking device according to prior art designs which normally permit seat back folding but act to prevent folding when the vehicle is subjected to deceleration above a predetermined threshold level. The inertia sensitive seat back locking system shown in conjunction with this invention is also detailed by the previously mentioned issued U.S. patent.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a front elevational view of the seat recliner mechanism shown by FIG. 1;

FIG. 4 is a partial side view of the recliner components shown in a position wherein the seat back is locking at a particular seat back angle; and FIG. 5 is a partial side view of the recliner components shown in a position permitting the seat back angle to be adjusted.

DETAILED DESCRIPTION OF THE INVENTION

Figure 1:
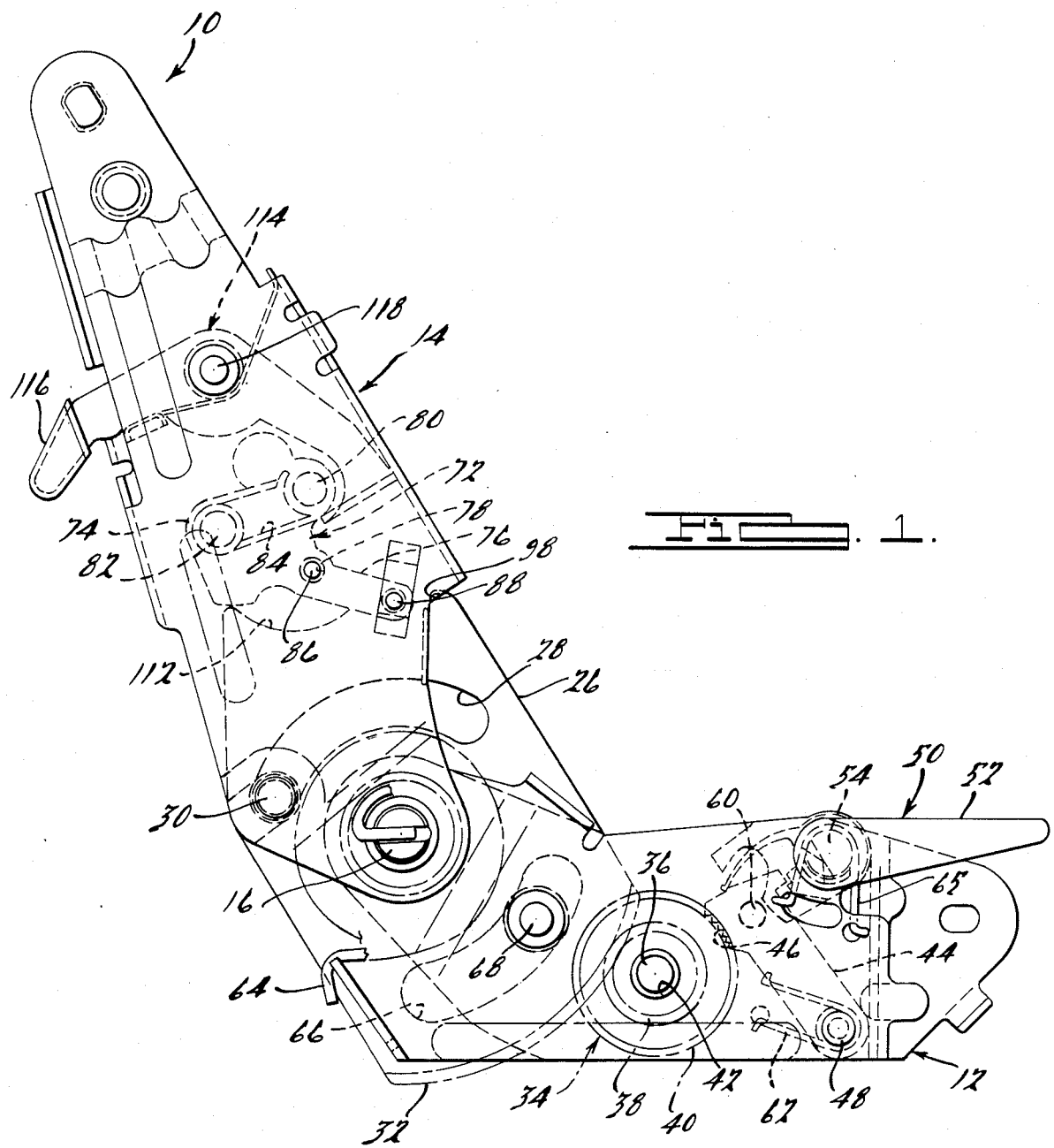
FIG. 1 is a side elevational view of the quick release gear operated seat recliner according to the teachings of the present invention.
Figure 2:
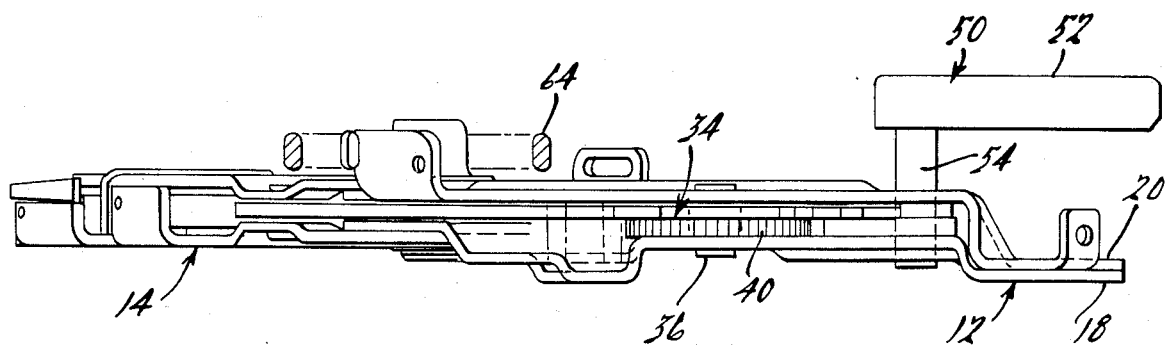
FIG. 2 is a bottom view of the seat recliner mechanism shown by FIG. 1.

A motor vehicle seat recliner mechanism according to this invention is shown assembled in FIGS. 1, 2 and 3 and is generally designated there by reference character 10. The embodiment of recliner mechanism 10 described herein by the accompanying Figures is intended to be positioned at the righthand side of a motor vehicle's passenger's seat. A recliner structure useful for a front driver's seat would preferably employ components which are mirror image replications of those described herein. Recliner 10 includes lower recliner structure 12 which is attached to a seat bottom frame (not shown). Upper recliner structure 14 is attached to the seat back frame (not shown) and is adapted to pivot with respect to lower recliner structure 12 about pivot pin 16. Lower recliner structure 12 is fabricated by attaching two plates, inner lower recliner plate 18 and outer lower recliner plate 20. These plates are attached together by rivets and define a space therebetween within which additional components, which will hereinafter be described, are installed. Recliner upper structure 14 is similarly fabricated by attaching two plates, inner upper recliner plate 22 and outer upper recliner plate 24. These plates are also formed to define a space therebetween.

Journaled to pivot pin 16 is quadrant 26. The position of quadrant 26 establishes the angular position of upper recliner structure 14 with respect to lower recliner structure 12, and therefore, between the seat back and bottom. As shown by the Figures, quadrant 26 includes arcuate slot 28. Pin 30 is attached to upper recliner structure 14 and travels with slot 28. The angular extent of slot 28 therefore defines the maximum extent of angular folding of the upper recliner structure. For four door models where a seat back folding mechanism is unnecessary, quadrant 26, or its functional equivalent, is fastened directly to upper recliner structure 14 or is made integral therewith.

In accordance with a principal feature of this invention, quadrant 26 includes curved toothed rack 32 along its lower edge. Toothed rack 32 is formed along a circular path having a center about pivot pin 16. Gear 34 is rotatable about pivot pin 36 which is attached to lower recliner structure 12 and meshes with toothed rack 32. Preferably, gear 34 includes a stepped external surface forming first diameter gear section 38 and second diameter gear section 40. As shown by FIG. 1, first diameter gear section 38 has a diameter less than that of second diameter section 40. Pivot pin 36 cooperates with bore 42 of gear 38 to permit free rotation of the gear. Gear 34 is positioned so that toothed rack 32 meshes with first diameter gear section 38, thereby causing rotation of the gear as the angular position of quadrant 26 is changed with respect to pivot pin 16.

Fixing of the position of quadrant 26 is achieved by causing toothed surface 46 of pawl 44 to engage second diameter gear section 40. Pawl 44 is restrained from moving when engaged with gear 34 since it is pivotably mounted about pivot pin 48. Pawl 44 is caused to move between a position of engagement with gear 34 shown by FIGS. 1 and 4 to a disengaged position shown by FIG. 5 by providing recliner actuator 50 which includes handle 52 and which is rotatable about pivot pin 54. Pivot pin 54 is journalled onto camplate 55 such that the camplate rotates with rotation of the pivot pin. Camplate 55 includes notch 56 forming a cam surface. Pivot pin 54 is further journalled onto quick release cam 57 which includes a protruding resilient arm 58 and a notched engaging portion 59. The internal bore 61 of quick release cam 57 is configured such that the cam is not caused to rotate until a predetermined degree of counterclockwise rotation of handle 52 and cam plate 55 occurs. Once this predetermined amount of rotation occurs, continued lifting of handle 52 causes counterclockwise rotation of quick release cam 57. Such rotation occurs until notched engaging portion 59 of quick release cam 57 clears tab 47 of pawl 44 thereby permitting rotation of the pawl about pivot 48. Rotation of pawl 44 results from the clockwise biasing force applied by spring 62. Once pawl 44 rotates away from engagement, the seat back reclined position can be adjusted since quadrant 26 is then free to rotate. The predetermined degree of angular motion of handle 52 with respect to quick release cam 57 is chosen such that, once this degree of rotation is achieved, camplate 55 has been rotated a sufficient degree to permit clockwise rotation of pawl 44. Due to the employment of quick release cam 57 and the bias force of spring 62, pawl 44 releases rapidly from contact with gear 34, thereby preventing any ratcheting which might occur if the pawl were gradually released from engagement with the gear.

When handle 52 is returned to its normal position, the interaction of notch 56 and pin 60 which is fixed to pawl 44 forces re-engagement between the pawl and gear 34. Resilient arm 58 of quick release cam 57 provides a constant clockwise rotational urging force on the cam. Internal bore 61 of quick release cam 57 is relieved such that a certain degree of "lost motion" is permitted, enabling actuator pivot pin 54 to be rotated without rotating quick release cam 57. Therefore, once pawl 44 is positioned into engagement with gear 34, quick release cam 57 notched engaging portion 59 returns into engagement with pawl tab 47. Once engaging portion 59 engages pawl tab 47, the pawl is securely positioned into engagement with gear 34, thereby preventing inadvertent changes in seat back reclined position unless recliner actuator 50 is moved. Recliner actuator 50 is normally positioned to cause engagement between pawl 44 and gear 34 by providing spring 65 which biases recliner handle 52 in a clockwise direction. In the event of failure of quick release cam 57 or spring 62, the recliner mechanism remains operable since notch 56 of camplate 55 will continue to guide pawl 44 into and out of engagement with gear 34 as actuator 50 is rotated.

Adjustment of the position of the seat back is simplified by providing pivot pin spring 64 which engages pivot pin 16 and lower recliner structure 12 thereby resiliently biasing the seat back in a clockwise forward position, with respect to the orientation shown by FIG. 1. Such biasing permits the occupant to easily adjust the seat back position while seated simply by raising recliner handle 52 and pushing against the seat back until the desired angular position is obtained, whereupon the recliner handle is released to its normal position. Fine adjustment of the angular position of upper recliner structure 14 is provided by using very fine pitch teeth on second diameter gear section 40 and pawl toothed section 46. Such components provide smaller steps between adjusted positions as toothed surface 46 engages with successive teeth along second diameter gear section 40. The provision of an enlarged second diameter gear section 40 enables smaller pitch teeth to be used since the enlarged diameter results in a lowered requirement of force restraint between toothed surface 46 and second diameter gear section 40.

Since it is desirable to limit the maximum range of recliner angular positions, slot 66 is provided within quadrant 26. Pin 68, which is attached to lower recliner structure 12, travels within slot 66 and limits the maximum degree of angular reclined position between upper recliner structure 14 and lower recliner structure 12.

For use in two door car models, motor vehicle seat recliner 10 according to this invention further features inertia sensitive actuator 72 which prevents forward rotation of the seat back during conditions of sudden deceleration of the associated motor vehicle. Inertia sensitive actuator 72 of vehicle recliner 10 interacts with quadrant 26 and responds to vehicle deceleration to prevent forward displacement of the seat back. Actuator 72 includes upper weighted section 74, lower engaging portion 76 with bore 78 therebetween. Upper weighted section 74 includes fixed weight 80 and rolling weight 82, which is permitted to roll within slot 84 in response to vehicle deceleration. Pivot pin 86 is attached to upper recliner structure 14 and passes through bore 78 and cooperate to form a low friction bearing permitting free rotation of actuator 72. The actuator is configured such that its centroid of mass (center of gravity) lies above pivot pin 86 so that, upon vehicle deceleration, rolling weight 82 moves forward within slot 84 and the actuator is caused to rotate in a clockwise direction, with respect to the orientation shown by FIG. 1. Engaging portion 76 of actuator 72 supports engaging pin 88. Engaging pin 88 is retained in association with engaging section 76 since it is trapped between locally deformed portions 90 and 92 which form slots 94 and 96 respectively, within upper recliner plates 22 and 24. Quadrant 26 includes a notched upper portion defining stop surface 98. Therefore, when a predetermined level of vehicle deceleration is sensed by actuator 72, the forward movement of upper recliner structure 14 is limited due to engagement between engaging pin 88 and stop surface 98. Forward movement of upper recliner structure 14 in this situation is prevented due to engagement of engaging pin 88 with stop surface 98 of quadrant 26, and the edges of slots 94 and 96. Under normal circumstances, the seat back may be freely rotated forward, since engaging pin 88 is permitted to escape engagement with surface 98. Such escapement is provided by placement of the centroid of mass (center of gravity) of actuator 72 such that the actuator is normally biased by gravity in a counterclockwise direction.

In order to provide enhanced reliability of engagement between actuator 72 and stop surface 98, curved quadrant surface 112 is provided which contacts the actuator such that it is biased clockwise when the seat back is in its rearmost position. Slight forward rotation of the seat back relieves this bias and enables actuator 72 to either cause the engaging pin 88 to escape engagement with stop surface 98, or engage with the stop surface in response to vehicle deceleration.

An emergency releasing mechanism is provided to enable rear seat occupants to extract themselves from the vehicle in the event of failure of the inertia sensitive components of the seat recliner or in the event that vehicle inclination causes the hinge mechanism to latch. Therefore, release actuator 114 is provided having a rearwardly projecting portion 116 which may be rotated about pivot pin 118 by the rear seat occupants so that the release actuator is caused to rotate in a counterclockwise position about pivot pin 86, thereby withdrawing engaging pin 88 from engagement with stop surface 98 and permitting the seat back to be folded forward.

While the above description constitutes the preferred embodiments of the present invention, it will be appreciated that the invention is susceptible to modification, variation and change without departing from the proper scope and fair meaning of the accompanying claims.

What is claimed is:

1. A seat recliner mechanism supporting a seat back and seat bottom which permits the angle therebetween to be controllably varied comprising:
   a lower recliner structure,
   an upper recliner structure,
   first pivot means rotatably attaching said lower recliner structure to said upper recliner structure,
   a toothed rack operatively connected to one of said upper or lower recliner structures,
   second pivot means carried by the other of said upper or lower recliner structures,
   gear means mounted to said second pivot means for rotation thereabout, said toothed rack meshing with said gear means,
   pawl means for engaging said gear means to control rotation of said gear means,
   third pivot means connected to said other of said upper or lower recliner structures,
   a recliner actuator rotatable about said third pivot means between a normal position and a released position,
   quick release cam means rotatable about said third pivot means, said quick release cam means coupled to said recliner actuator,
   lost motion means coupling said recliner actuator to said quick release cam means such that said quick release cam means is caused to rotate once the rotation of said recliner actuator from said normal position toward said released position exceeds a predetermined angular displacement, said quick release cam means having an engagement portion which cooperates with said pawl means such that when said recliner actuator is in said normal position, said engagement portion engages said pawl means and to maintain said pawl means in a position to engage said gear means and when said recliner actuator is moved toward said released position, said quick release cam means is rotated such that said engagement portion disengages said pawl, said quick release cam means permitting said pawl means to move from an engaged to a disengaged position quickly, and
   a camplate rotatable with said recliner actuator, said camplate having a cam surface which cooperates with said pawl means to urge said pawl means into engagement with said gear means when said recliner actuator is rotated from said released position to said normal position.

2. A seat recliner mechanism according to claim 1 wherein said toothed rack is operatively connected to said upper recliner structure and said second pivot means is connected to said lower recliner structure.

3. A seat recliner mechanism according to claim 2 further comprising stop means for limiting the maximum extent of angular travel between said seat bottom and seat back.

4. A seat recliner mechanism according to claim 1 wherein said toothed rack is curved along a circular path having a radius about said first pivot means.

5. A seat recliner mechanism according to claim 1 wherein said gear forms first and second toothed diameter sections, said first diameter section meshing with said toothed rack, said second diameter section engageable with said pawl means.

6. A seat recliner mechanism according to claim 5 wherein the diameter of said first diameter section is less than the diameter of said second diameter section.

7. A seat recliner mechanism according to claim 1 wherein said pawl means pivots about a fourth pivot means.

8. A seat recliner mechanism according to claim 1 wherein said quick release cam means further includes biasing means biasing said quick release cam means toward an angular position wherein said engagement portion engages said pawl means.

9. A seat recliner mechanism according to claim 8 wherein said biasing means comprises a resilient arm operatively associated with said quick release cam means, said resilient arm further contacting said pawl means.

10. A seat recliner mechanism according to claim 1 further comprising biasing means biasing said pawl means toward a position wherein said pawl means is disengaged from said gear.

11. A seat recliner mechanism according to claim 1 wherein said quick release cam engagement portion forms a notch which contacts a tab formed by said pawl means.

12. A seat recliner mechanism according to claim 1 wherein said camplate cam surface cooperates with a pin projecting from said pawl means.

13. A seat recliner mechanism according to claim 1 wherein said camplate cam surface is formed by a notch which acts to pull said pawl means from engagement with said gear when said recliner actuator is moved to said second position in the event of mechanical failure of said quick release cam.

14. A seat recliner mechanism according to claim 1 wherein said recliner actuator is biased toward said first position.

15. A seat recliner mechanism supporting a seat back and seat bottom which permits the angle therebetween to be controllably varied comprising:
   a lower recliner structure,
   an upper recliner structure,
   first pivot means rotatably attaching said lower recliner structure to said upper recliner structure,
   a quadrant operatively connected to said upper recliner structure, said quadrant pivotable about said first pivot means, said quadrant having a curved toothed rack,
   second pivot means carried by said lower recliner structure,
   gear means mounted to said second pivot means for rotation thereabout, said toothed rack meshing with said gear means,
   pawl means having one or more teeth for engagement with said gear means to control rotation of said gear means,
   third pivot means connected to said lower recliner structure,
   a recliner actuator rotatable about said third pivot means between a normal position and a released position,
   quick release cam means rotatable about said third pivot means, said quick release cam means coupled to said recliner actuator,
   lost motion means coupling said recliner actuator to said quick release cam means such that said quick release cam means is caused to rotate once the rotation of said recliner actuator from said normal position to said released position exceeds a predetermined angular displacement, said quick release cam means having an engagement portion which cooperates with said pawl means such that when said recliner actuator is in said normal position, said engagement portion engages said pawl means to cause said pawl means to engage said gear means and when said recliner actuator is moved toward said released position, said quick release cam means is rotated such that said engagement portion disengages said pawl means, said quick release cam means permitting said pawl means to move from an engaged to a disengaged position quickly, and
   a camplate rotatable with said recliner actuator, said camplate having a cam surface which cooperates with said pawl means to urge said pawl means into engagement with said gear means when said recliner actuator is rotated from said released position to said normal position.

16. A seat recliner mechanism according to claim 15 further comprising stop means for limiting the maximum extent of angular travel between said seat bottom and seat back.

17. A seat recliner mechanism according to claim 15 wherein said gear forms first and second toothed diameter sections, said first diameter section meshing with said toothed rack, said second diameter section engageable with said pawl teeth.

18. A seat recliner mechanism according to claim 17 wherein the diameter of said first diameter section is less than the diameter of said second diameter section.

19. A seat recliner mechanism according to claim 15 wherein said pawl pivots about a fourth pivot means.

20. A seat recliner mechanism according to claim 15 wherein said quick release cam further includes biasing means biasing said quick release cam toward an angular position wherein said notched engaging portion engages said pawl.

21. A seat recliner mechanism according to claim 15 wherein said biasing means comprises a resilient arm operatively associated with said quick release cam, said resilient arm further contacting said pawl.

22. A seat recliner mechanism according to claim 15 further comprising biasing means biasing said pawl toward a position wherein said pawl is disengaged from said gear.

23. A seat recliner mechanism according to claim 15 wherein said quick release cam engaging portion forms a notch which contacts a tab formed by said pawl.

24. A seat recliner mechanism according to claim 15 wherein said camplate cam surface cooperates with a pin projecting from said pawl.

25. A seat recliner mechanism according to claim 15 wherein said camplate cam surface is formed by a notch which acts to pull said pawl from engagement with said gear when said recliner actuator is moved to said second position in the event of mechanical failure of said quick release cam.

* * * * *